United States Patent [19]

Shyi-Hon

[11] Patent Number: 5,422,589

[45] Date of Patent: Jun. 6, 1995

[54] CIRCUIT FOR SYNCHRONIZING AN OPERATING CLOCK OF A SWITCHING POWER SUPPLY SYSTEM

[75] Inventor: Chen Shyi-Hon, Taoyuan, Taiwan, Prov. of China

[73] Assignee: Acer Peripherals, Inc., Taiwan, Prov. of China

[21] Appl. No.: 147,627

[22] Filed: Nov. 5, 1993

[51] Int. Cl.6 .............................................. H02J 1/00
[52] U.S. Cl. .................................... 327/530; 315/411; 348/537; 348/730
[58] Field of Search ...................... 307/228; 315/411; 328/63, 72; 348/537, 730; 636/20, 21; 327/530

[56] References Cited

U.S. PATENT DOCUMENTS

| | | | |
|---|---|---|---|
| 4,486,822 | 12/1984 | Marinus | 363/19 |
| 4,536,684 | 8/1985 | Babcock | 315/411 |
| 4,692,852 | 9/1987 | Hoover | 363/21 |
| 4,829,216 | 5/1989 | Rodriguez-Cavazos | 315/411 |
| 4,994,719 | 2/1991 | Lendaro | 315/411 |
| 5,034,667 | 7/1991 | Lendaro | 315/411 |
| 5,079,666 | 1/1992 | Naim | 361/85 |
| 5,089,947 | 2/1992 | Driscoll et al. | 363/20 |

*Primary Examiner*—Timothy P. Callahan
*Assistant Examiner*—Jeffrey Zweizig
*Attorney, Agent, or Firm*—Fish & Richardson

[57] ABSTRACT

A circuit for synchronizing an operating clock of a switching power supply (SPS) system is provided. The SPS has an oscillator, a primary control circuit, a secondary voltage generation circuit, a feedback control circuit. The oscillator outputs an oscillation signal to the primary control circuit. The feedback control circuit, in response to a direct current (DC) voltage from the secondary voltage generation circuit, generates a DC feedback voltage signal. The synchronization circuit comprises an isolation device, a signal separation circuit and a triangle-wave generation circuit. The isolation device has an input terminal and an output terminal. The input terminal receives a horizontal synchronization signal and the DC feedback voltage signal. A mixed signal is generated at the output terminal as a result of amplitude-modulating the DC feedback voltage signal by the horizontal synchronization signal. The input terminal is voltage-isolated from the output terminal. The signal separation circuit generates a synchronization signal by filtering out the component of the DC feedback voltage signal of the mixed signal. The triangle-wave generation circuit has an output terminal and an input terminal. The input terminal receives the synchronization signal and the output terminal generates the operating clock of triangle-like shape, which is synchronized with the horizontal synchronization signal, to the oscillator.

12 Claims, 4 Drawing Sheets

CIRCUIT FOR SYNCHRONIZING AN OPERATING CLOCK OF A SWITCHING POWER SUPPLY SYSTEM

TECHNICAL FIELD OF THE INVENTION

The invention relates in general to a circuit for synchronizing an operating clock of a switching power supply system and, in particular, of a switching power supply system within a video display system.

BACKGROUND OF THE INVENTION

In a video display system, the precision and the stability of the horizontal synchronization signal, abbreviated as Hsync, are the most important factors affecting the reliability or quality of the overall video display system.

Typically, a switching power supply (SPS) system is used to provide a required voltage to a video display system. From previous experience, the Hsync signal fluctuates unexpectedly due to the interference of the output of the switching power supply system.

In order to prevent the output of the switching power supply system from interfering the video display system, the conventional arts employ several different approaches to synchronize the operating clock of the switching power system with the Hsync signal.

As shown in FIG. 1, the first one of the conventional approaches, a horizontal synchronization signal 131 is retrieved from the fly-back transformer 13 to synchronize the triangle-wave generation circuit 14 which forces the operating clock 151 output from the oscillator 15 to be synchronized with the synchronization signal 131. Therefore, the operation within the primary circuit 11 and the outputs therefrom are all synchronized with the horizontal synchronization signal 131. By this approach, the reliable operation of the video display system is achieved. However, since the oscillator 15 and the primary circuit 11 falls within the high voltage primary side, double-insulation wire must be used for the signal line of Hsync signal 131 to meet the requirement of various safety standards. If double-insulation wire is not used, the high voltage of the primary side may be transmitted to the secondary side exposing the user of the video display system to the danger of electrical shock. This approach has higher costs due to the requirement of the double-insulation wire for Hsync signal 131. The block 12 is a horizontal circuit of the secondary side.

As shown in FIG. 2, the second of the conventional approaches, a horizontal synchronization signal 231 is retrieved from the fly-back transformer 23 and fed to an isolation transformer 24, and a synchronization signal 241 from the isolation transformer 24 is used to synchronize the triangle-wave generation circuit 26 which forces the operating clock 251 output from the oscillator 25 to be synchronized with the horizontal synchronization signal 231. Therefore, the operation within the primary circuit 21 and the outputs therefrom are all synchronized with the horizontal synchronization signal 231. By this approach, the reliable operation of the video display system is achieved, and due to the high voltage of the primary side is isolated from the secondary side by the isolation transformer 24, a wire of low-cost general type may be used for the signal line 231. However, the cut-down of the wire costs for the signal line 231 is offset by the cost of an additional isolation transformer 24 for this approach. Therefore this approach is still not a better one. The block 22 is a horizontal circuit of the secondary side.

As shown in FIG. 3, the third of the conventional approaches, a horizontal synchronization signal 321 is retrieved from the horizontal circuit 32 and fed to an isolation photo-coupler 33, and a synchronization signal 331 output from the isolation photo-coupler 33 is used to synchronize the triangle-wave generation circuit 34 which forces the operating clock 351 output from the oscillator 35 to be synchronized with the horizontal synchronization signal 321. Therefore, the operation within the primary circuit 31 and the outputs therefrom are all synchronized with the horizontal synchronization signal 321. By this approach, the reliable operation of the video display system is achieved, and due to the high voltage of the primary side is isolated from the secondary side by the isolation photo-coupler 33, a wire of low-cost general type may be used for the signal line 321. However, the cut-down of the wire costs for the signal line 321 is offset by the cost of an additional isolation photo-coupler 33 for this approach. Therefore this approach, as the second one, is still not a better one. In a typical switching power supply system, a plurality of photo-couplers are used to transmit signals while isolating the high voltage of the primary side from the secondary side.

SUMMARY OF THE INVENTION

To the shortcomings of the conventional approaches recited above, the present invention provides a circuit for synchronizing an operating clock of a switching power supply system. The invention employs an isolation device, a signal separation circuit and a triangle-wave generation device to synchronize the operation clock of the switching power supply system. The isolation device is fed with a horizontal synchronization signal and a direct current (DC) feedback voltage signal. The isolation device employed is one which already exists in the switching power supply system.

The utility and characteristic of the invention may be further understood by the following recitation on the invention accompanied by the appended drawings.

DETAILED DESCRIPTION OF THE PRESENT INVENTION

Figure 4:
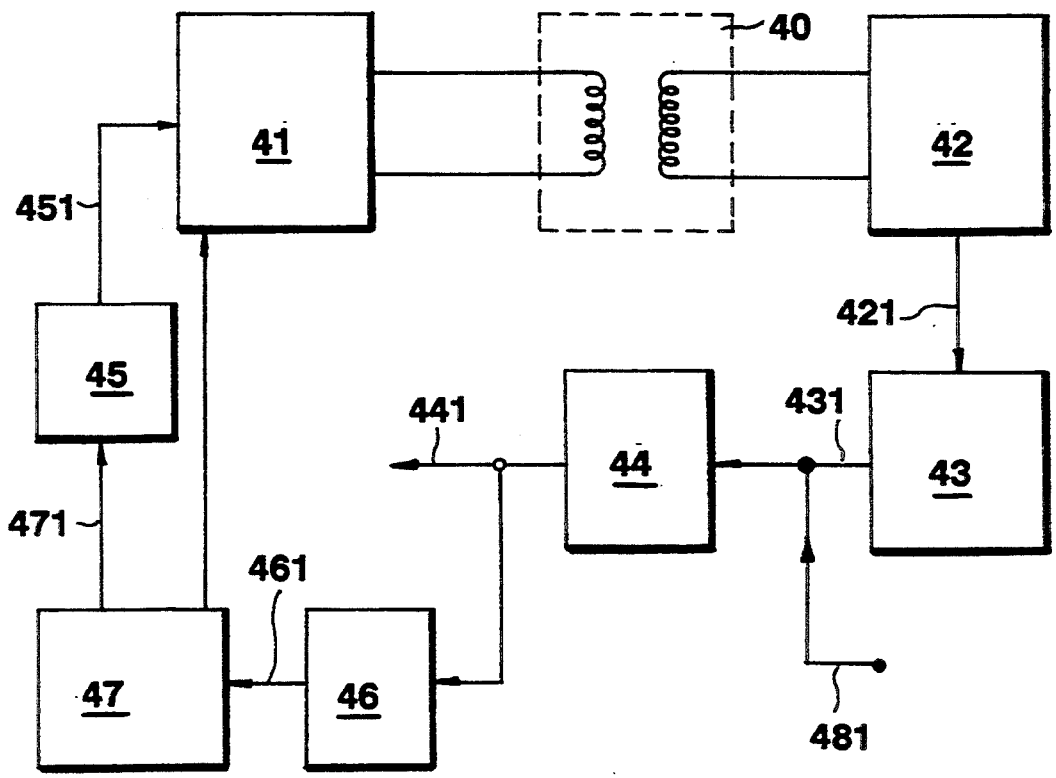
FIG. 4 shows a functional block of the present invention.

As shown in portions of FIG. 4, a typical conventional switching power supply system mainly comprises a primary control circuit 41, a secondary voltage generation circuit 42, a feedback control circuit 43, an isolation device 44, a transformer 40, a triangle-wave generation circuit 47 and a oscillator 45. By the implementation of the transformer 40 and the isolation device 44, the high voltage of the left hand primary side of the power supply is isolated from the circuit of the right hand secondary side. The safety of the user of the video display system, which has the power supply system inside the video display system, can be guaranteed. The secondary voltage generation circuit 42 outputs a direct current (DC) voltage signal 421 and in response to which the feedback control circuit 43 generates a DC feedback voltage signal 431.

As shown in again FIG. 4, the present invention utilizes an isolation device 44 and a signal separation circuit 46 to synchronize the output of the oscillator 45. Therefore, the operating clock of the switching power supply is synchronized with the horizontal synchronization signal 481.

Figure 1:
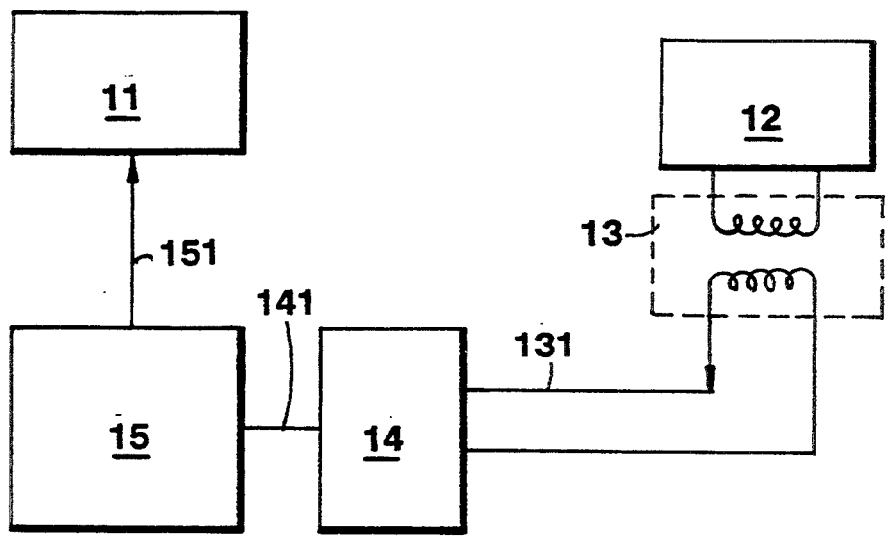
FIG. 1 shows a synchronization circuit in accordance with the conventional art.
Figure 2:
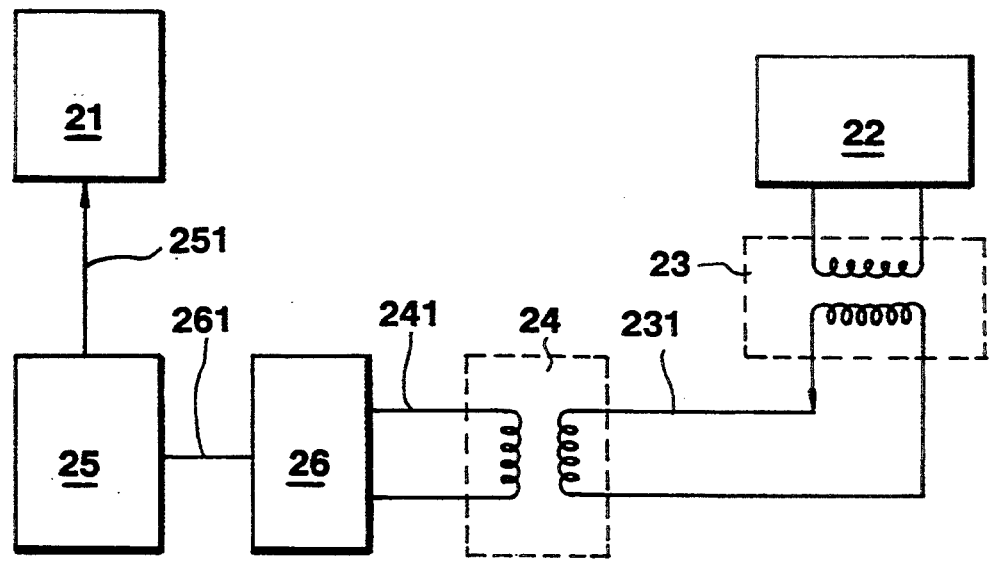
FIG. 2 shows another synchronization circuit in accordance with the conventional art.
Figure 3:
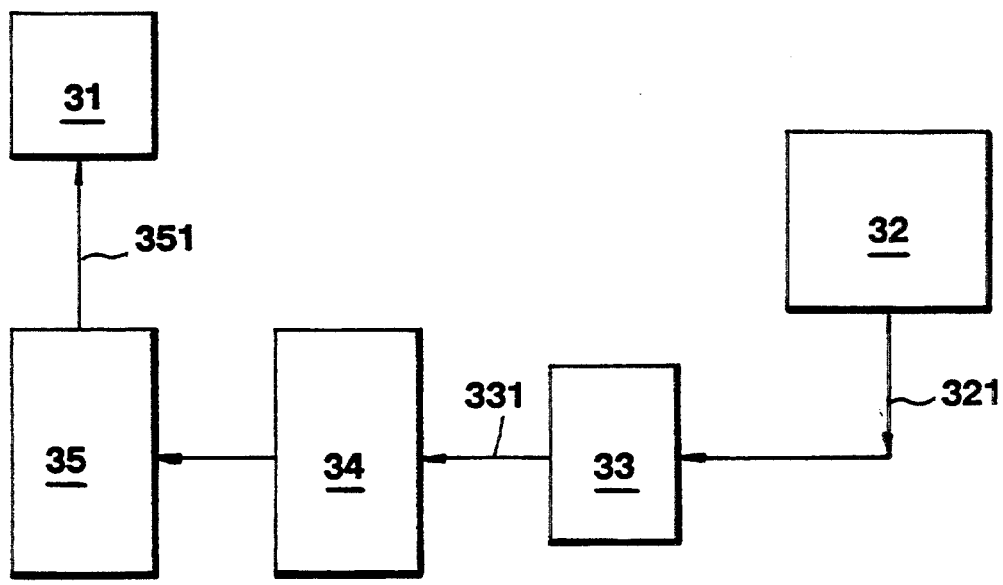
FIG. 3 shows still another synchronization circuit in accordance with the conventional art.

The isolation device 44 of the invention inputs not only a DC feedback voltage signal 431 but a horizontal synchronization signal 481. The horizontal synchronization signal 481 may be retrieved from a plurality of locations of the video control circuits. The common location is the output terminal of the fly-back transformer, as shown in FIG. 1 or FIG. 2, or the terminal of horizontal circuit, as shown in FIG. 3.

The DC feedback voltage signal 431 is used as a carrier wave and is amplitude-modulated by the horizontal synchronization signal 481. The isolation device 44 thus generates a mixed signal 441.

The signal separation circuit 46 generates a synchronization signal 461 by filtering out the component of the DC feedback voltage signal of the mixed signal 441.

The triangle-wave generation circuit 47, inputing a reference voltage, generates a triangle-wave operating clock 471 to oscillator 45, under the control of the primary control circuit 41. The primary control circuit 41 has a comparator and corresponding control circuit, and under the control of which, when the output voltage 471 of the triangle-wave generation circuit exceeds an upper limit, the output voltage 471 will be discharging to a ground through a path within the control circuit 41. As a result of this process, an operating clock 471 of a triangle-wave is therefore generated at the output of the generation circuit 47. For detailed information of the above description, the technical information for commercially available integrated circuit, i.e. UC 3842 manufactured by Motorola or SGS-Thompson, will be helpful.

The synchronization signal 461 is input to an input terminal of the triangle-wave generation circuit 47 sharply escalating a voltage of a terminal of a capacitor within the circuit 47. A operating clock 471 which is synchronized with the horizontal synchronization signal 481 is therefore generated at an output terminal of the triangle-wave generation circuit 47. Since the operating clock 471 input to the oscillator 45 is synchronized with the horizontal synchronization signal 481, the oscillation signal 451 therefrom and the operations within the primary control circuit 41 are all synchronized with the horizontal synchronization signal 481, and by which the purpose of the invention is achieved.

Figure 5:
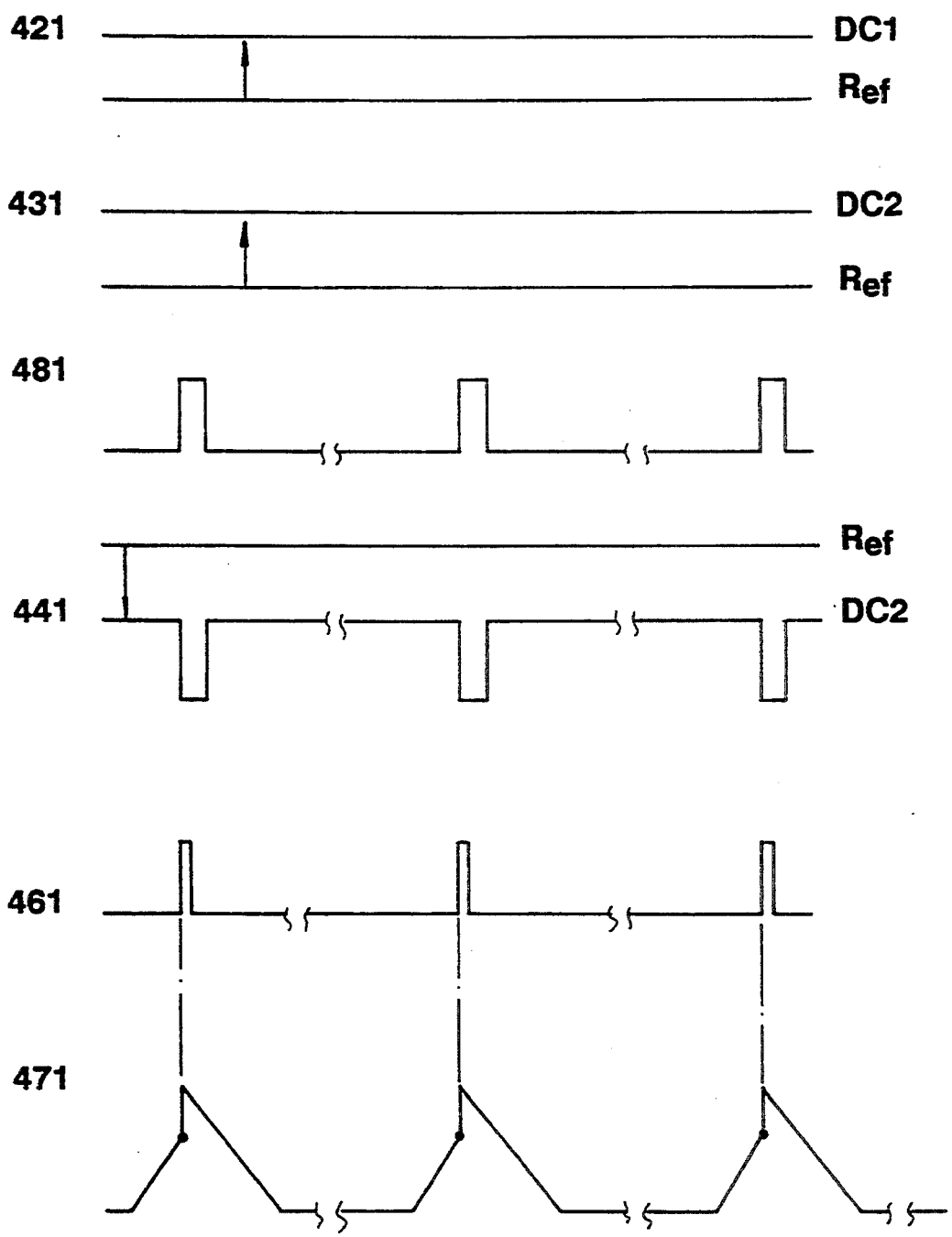
FIG. 5 shows the timing relationship of the signals in FIG. 4.

The timing and relation of the signals recited above are disclosed in FIG. 5.

In short, the present invention utilizes an isolation device 44 which already exists to input the horizontal synchronization signal 481 in addition to the DC feedback voltage signal 431. An additional signal separation circuit 46 is only required to complete the invention. The cost of the invention is less expensive compared to the conventional approaches.

Figure 6:
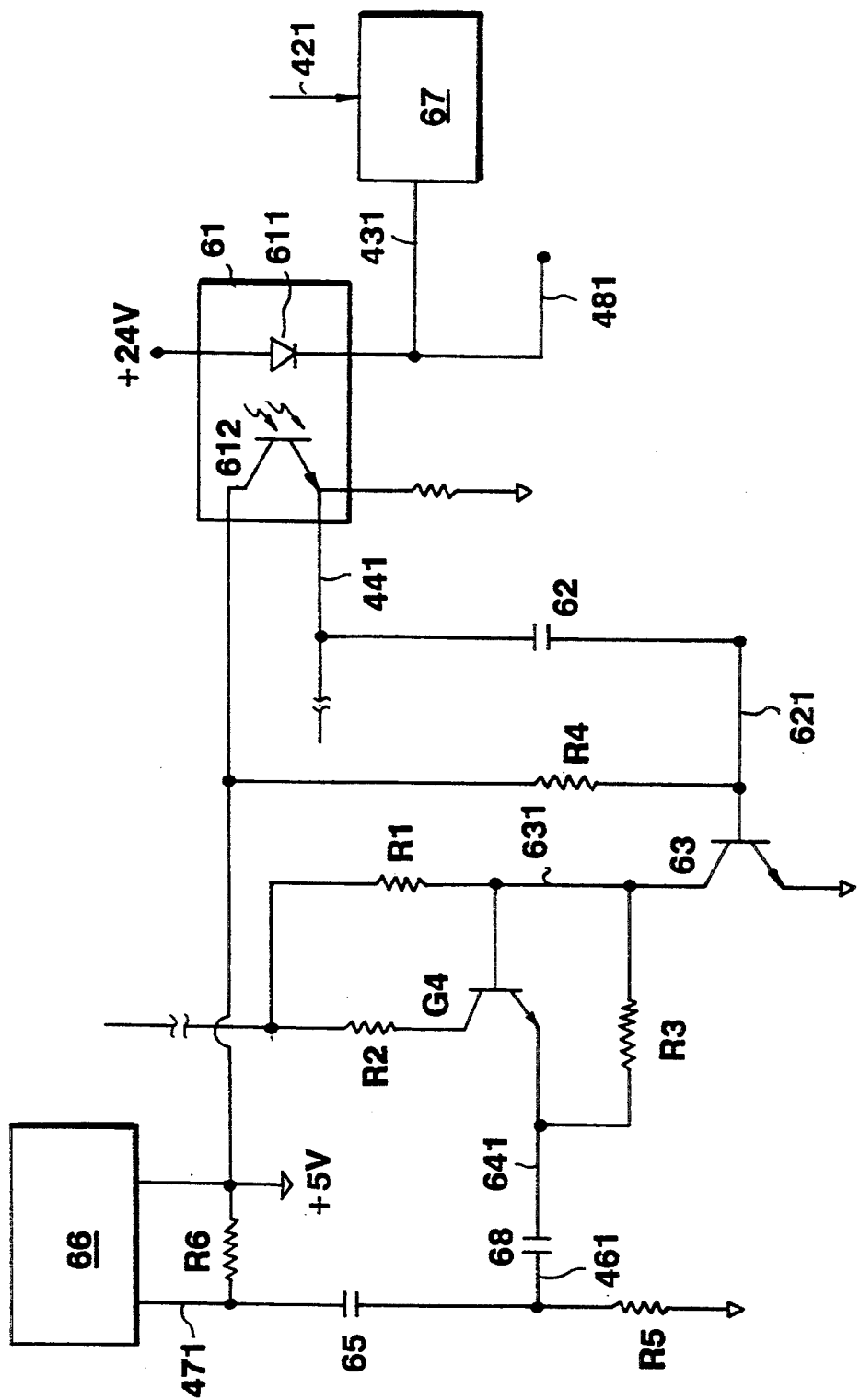
FIG. 6 shows one preferred embodiment of the invention.

As shown in FIG. 6, one preferred embodiment of the invention is disclosed. The isolation device 61 is a photo-coupler which has a light emitted diode (LED) 611 and a phototransistor 612. A cathode of the LED 611 inputs the horizontal synchronization signal 481 and the DC feedback voltage signal 431. The circuit block 67 is a feedback control circuit and outputs a DC feedback voltage signal 431. An anode of the LED 611 is coupled to a reference voltage. The photo-transistor 612 generates the mixed signal 441 at an emitter terminal therein, in response to a light signal from the LED 611.

The preferred embodiment of the signal separation circuit 46 mainly comprises a capacitor 62. A first terminal of the capacitor 62 inputs the mixed signal 441. A second terminal of the capacitor 62 outputs a first synchronization signal 621.

The signal separation circuit 46 may further comprises a signal amplify transistor 63. The base terminal of the transistor 63 is coupled to the second terminal of the capacitor 62 and the collector terminal of the transistor 63 generates an amplified second synchronization signal 631. The main objective of the transistor 63 is signal amplification. The base terminal of the transistor 63 is connected to the +5 V through a resistor R4, and, as is well known in general circuit theory, the resistor R4 together with the capacitor 62 functions as a differentiation circuit to the mixed signals 441. When the respective tolerances of the elements used in the invention are different or the pulse-height of the horizontal synchronization signal 481 varies, by the implementation of the transistor 63, synchronization of the operating clock 471 can still be attained. The R1 is the load resistor of the transistor 63.

The signal separation circuit 46 may further comprises a signal driving transistor 64. The base terminal of the transistor 64 is coupled to the collector terminal of the transistor 63. The current of the second synchronization signal 63 1 is amplified by the transistor 64 to generate the synchronization signal 641 at the emitter terminal of the transistor 64. R2 is the current-limiting resistor of the transistor 64.

The resistor R5 and the capacitor 68 are coupled to form a differentiation circuit for the signal 641. The output signal 461 is therefore a synchronized pulse signal. R3 is the discharging resistor of the capacitor 68.

The preferred embodiment of the triangle-wave generation circuit comprises a resistor R6 and a capacitor 65. The capacitor 65 has a first terminal inputing the pulse signal 461, and a second terminal coupled to a first terminal of the resistor R6 for generating the operating clock 471. The voltage of the first terminal of the capacitor 65 is sharply escalating due to the pulse signal 461, and the output signal 471 is therefore synchronized with the horizontal signal 481, as shown in FIG. 5. The second terminal of the resistor R6 is coupled to a reference voltage. The block 66 includes the oscillator and the primary control circuit. It is well understood in this art that there are many other circuits can generate a triangle-wave signal as the shown preferred embodiment does.

It has to be understood that the above recited embodiment is only illustrative rather than limiting. Not only the above preferred embodiment of the invention, but the equivalence thereof are intended scope of the protection of the invention which is defined by the following claims.

What is claimed is:

1. A circuit for synchronizing an operating clock of a switching power supply (SPS) system, the SPS having an oscillator, a primary control circuit, a secondary voltage generation circuit, a feedback control circuit, the oscillator outputting an oscillation signal to the primary control circuit, the feedback control circuit, in response to a direct current (DC) voltage from the secondary voltage generation circuit, generating a DC feedback voltage signal, comprising:

isolation means having an input terminal and an output terminal, said input terminal receiving a horizontal synchronization signal and said DC feedback voltage signal, a mixed signal being generated at said output terminal as a result of amplitude-modulating said DC feedback voltage signal by said horizontal synchronization signal, said input terminal being voltage-isolated from said output terminal;

a signal separation circuit for generating a synchronization signal by filtering out the component of said DC feedback voltage signal of said mixed signal;

a triangle-wave generation circuit having an output terminal and an input terminal, the input terminal receiving said synchronization signal, the output terminal generating said operating clock of triangle-like shape, which is synchronized with said horizontal synchronization signal, to said oscillator.

2. The circuit recited as claim 1, wherein said isolation means comprises a photo-coupler, said photo-coupler having a light emitting diode (LED) and phototransistor, said LED having a cathode coupled to the input terminal of said isolation means, having an anode coupled to a terminal of a reference voltage, the phototransistor having an emitter terminal for generating said mixed signal, in response to a light signal from said LED.

3. The circuit recited as claim 1, wherein said signal separation circuit comprises a capacitor, the capacitor having a first terminal inputing said mixed signal, having a second terminal outputing a first synchronization signal.

4. The circuit recited as claim 1, wherein said signal separation circuit further comprises a signal amplify transistor having a base terminal and a collector terminal, the base terminal being coupled to the second terminal of said capacitor, the collector terminal generating a second synchronization signal of a current.

5. The circuit recited as claim 1, wherein said signal separation circuit further comprises a signal driving transistor having a base terminal and emitter terminal, the base terminal being coupled to the collector terminal of said signal amplify transistor, the emitter terminal generating said synchronization signal by amplifying the current of said second synchronization signal.

6. The circuit recited as claim 1, wherein said triangle-wave generation circuit comprises a resistor and capacitor, the capacitor having a first terminal and a second terminal, the first terminal being coupled to said input terminal of said triangle-wave generation circuit, the second terminal of the capacitor being coupled to a first terminal of the resistor at the output terminal of said triangle-wave generation circuit, a second terminal of the resistor being coupled to a reference voltage.

7. The circuit recited as claim 1, wherein the synchronization signal is a pulse signal.

8. The circuit recited as claim 7, wherein said isolation means comprises a photo-coupler, said photo-coupler having a light emitting diode (LED) and phototransistor, said LED having a cathode coupled to the input terminal of said isolation means, having an anode coupled to a terminal of a reference voltage, the phototransistor having an emitter terminal for generating said mixed signal, in response to a light signal from said LED.

9. The circuit recited as claim 7, wherein said signal separation circuit comprises a capacitor, the capacitor having a first terminal inputing said mixed signal, having a second terminal outputing a first synchronization signal.

10. The circuit recited as claim 9, wherein said signal separation circuit further comprises a signal amplify transistor having a base terminal and a collector terminal, the base terminal being coupled to the second terminal of said capacitor, the collector terminal generating a second synchronization signal of a current.

11. The circuit recited as claim 10, wherein said signal separation circuit further comprises a signal driving transistor having a base terminal and emitter terminal, the base terminal being coupled to the collector terminal of said signal amplify transistor, the emitter terminal generating a third synchronization signal by amplifying the current of said second synchronization signal.

12. The circuit recited as claim 11, wherein said signal separation circuit further comprises a differentiation circuit for generating said pulse signal by differentiating said third synchronization signal.

* * * * *